United States Patent
Mack

[11] Patent Number: 5,858,153
[45] Date of Patent: Jan. 12, 1999

[54] METHOD FOR MAKING TUBULAR CONTAINERS

[75] Inventor: Robert Mack, Flemington, N.J.

[73] Assignee: Colgate-Palmolive Company, New York, N.Y.

[21] Appl. No.: 785,624

[22] Filed: Jan. 17, 1997

[51] Int. Cl.$^6$ ................................................... B32B 31/20
[52] U.S. Cl. .................. 156/201; 156/282; 156/308.4; 156/292; 156/466; 156/498; 156/544
[58] Field of Search .................. 156/201, 282, 156/308.4, 292, 498, 466, 544

[56] References Cited

U.S. PATENT DOCUMENTS

| | | | |
|---|---|---|---|
| 2,469,972 | 5/1949 | Lowry | 156/498 |
| 2,673,374 | 3/1954 | Strahm | 264/267 |
| 2,724,863 | 11/1955 | Gudge et al. | 264/451 |
| 2,725,091 | 11/1955 | Miner et al. | 156/583.3 X |
| 2,777,164 | 1/1957 | Strahm | 425/577 |
| 2,788,544 | 4/1957 | Voumard et al. | 425/384 |
| 2,883,706 | 4/1959 | Quinche et al. | 425/125 |
| 2,923,975 | 2/1960 | Voumard et al. | 425/393 |
| 2,945,266 | 7/1960 | Mainardi | 264/277 |
| 2,947,035 | 8/1960 | Baker | 264/267 |
| 2,958,898 | 11/1960 | Voumard et al. | 264/322 |
| 2,994,107 | 8/1961 | Quinche | 425/126.1 |
| 3,172,571 | 3/1965 | Marchak | 222/107 |
| 3,295,725 | 1/1967 | Brandt | 222/107 |
| 3,367,261 | 2/1968 | Kashiwagi | 100/310 |
| 3,580,795 | 5/1971 | Eichenlaub | 156/583.3 |
| 5,715,647 | 2/1998 | Keim et al. | 53/374.5 |

FOREIGN PATENT DOCUMENTS

| | | |
|---|---|---|
| 550198 | 8/1956 | Belgium . |
| 0710538 | 9/1995 | European Pat. Off. . |
| 1196995 | 11/1959 | France . |
| 2209652 | 7/1974 | France . |
| 58-031714 | 2/1983 | Japan . |
| 60-02178 | 10/1985 | Japan . |
| 62-212128 | 9/1987 | Japan . |
| 1220099 | 1/1971 | United Kingdom . |
| WO 97/00208 | 1/1997 | WIPO . |

OTHER PUBLICATIONS

PCT Search Report.

*Primary Examiner*—Francis J. Lorin
*Attorney, Agent, or Firm*—Michael McGreal

[57] ABSTRACT

In the manufacture of multichamber tubular containers it has been found that the inner divider walls should be bonded to the exterior wall by means of a band sealing method. In the band sealing method there is a band that contacts the upper film and a band that contacts the lower film that are to be bonded. In the present processes the upper band contacts the inner divider wall while the lower band contacts the exterior surface of the outer wall of the tubular container. In order to prevent the marring or otherwise putting a defect into the exterior surface of the outer wall the temperature of the lower band is maintained at a lower temperature than the upper band. This will decrease the temperature of the exterior surface of the outer wall and prevent imperfections in the exterior surface of the outer wall. The advantage is a multichamber tubular container without any imperfections in the exterior surface. This enhances the overall appearance of the tubular container.

17 Claims, 1 Drawing Sheet

METHOD FOR MAKING TUBULAR CONTAINERS

FIELD OF THE INVENTION

This invention relates to a method for bonding interior walls to tubular containers. More particularly, this invention relates to a method for attaching interior divider walls to a tubular container to produce a multichamber tubular container.

BACKGROUND OF THE INVENTION

There are various techniques for making multichamber tubular containers. The present invention is directed to multichamber tubular containers where each chamber contacts the exterior wall of the tubular container and extends longitudinally from the nozzle exit to the base of the tubular container. This is in distinction to the "tube in a tube" containers where the different chambers are located concentrically. It has been found that the arrangement where each chamber is in contact with the tube wall, i.e. with the tube wall forming a part of each tubular chamber, provides for more control over the dispensing of the contents from the tubular container. There will be a more uniform dispensing of the contents of each chamber in this construction of a multichamber tubular container.

One problem that is encountered in the manufacture of these multichamber tubular containers is the bonding of the interior divider walls onto the wall of the tubular container. In one method the interior wall or walls are attached to the tube wall prior to the tube being formed by bonding the two longitudinal edges of the divider wall to the outer wall. In this technique the interior wall is overlayed onto the outer tubular container wall, each in a flat orientation. The two longitudinal edges of the interior divider wall then are bonded to the interior surface of the outer tubular container wall. Upon the longitudinal edges of the outer wall being bonded together to form a tubular container there is formed a tubular container with two chambers. This can be a three or more chamber tubular container if there are additional interior walls. A problem that arises in the formation of these tubular containers is the bond of the interior dividing walls to the outer tube wall. There must be a strong, leak proof seal, but yet, one where there is no marring or otherwise putting an imperfection in the exterior surface of the outer tubular wall. Any imperfections will cause a perceptible imperfection in the tube decoration. Such imperfections are not acceptable since they affect the impression of the product by the potential purchaser. The product appears to be damaged.

Various techniques were tried in order to get a strong seal of the interior divider walls to the inner surface of the outer tubular container wall. A conventional heat seal formed by a heated platen surface on the interior divider wall has the problem that the divider wall is susceptible to sticking to the heated platen surface. Likewise, ultrasonic sealing was found not to be effective to form strong seals since the thin inner divider wall is susceptible to damage during the application of ultrasonic energy. The only technique to be found to be highly effective to produce strong seals at commercially feasible speeds with no imperfection in the exterior surface of the outer wall is the use of a band sealing technique where the band in contact with the exterior surface of the outer wall is held at a lower temperature than the band that is in contact with the surface of the divider wall. This results in strong seals with no imperfections in the exterior surface of the outer wall.

Band sealers customarily have two rotating bands. One band contacts the exterior surface of one material to be bonded and the other band contacts the exterior surface of the other material. In the present instance the one material is the chamber divider wall and the other material is the outer tubular container wall. The bands can be a metallic, ceramic or a plastic material. Polytetrafluoroethylene (PTFE) coated woven fiberglass bands have been found to be very effective. PTFE is stable at elevated temperatures and has a very lubricous surface. It will not adhere to the materials into which it comes into contact. The present invention is directed to the use of a band sealer where the band that is in contact with the exterior surface of the outer wall is maintained at a reduced temperature. This technique solves the problem of producing strong seals at commercially feasible speeds with no imperfections in the exterior surface of the outer wall of the container.

BRIEF SUMMARY OF THE INVENTION

The present invention is directed to a method for attaching interior divider walls to the inner surface of the outer wall of a container by the use of a band sealing technique. In the band sealing technique one band contacts the surface of the interior divider wall and the other band contacts the exterior surface of the outer wall. The band that contacts the surface of the interior divider wall is at a greater temperature than the band that contacts the exterior surface of the outer wall. The band that contacts the surface of the interior divider wall will be at about the sealing temperature of the plastic of the interior divider wall or above. This is a temperature sufficient to raise the temperature of the plastics to be bonded to about the melt temperature to about 15° C. below the melt temperature. The contact time will be about 0.05 to 20 seconds, and preferably about 0.1 to 10 seconds. The contact pressure of the belt with the plastic films will be about 0.1 kg/cm$^2$ to about 7 kg/cm$^2$ and preferably about 0.25 kg/cm$^2$ to about 4 kg/cm$^2$.

A key feature in the process is that the band in contact with the interior divider wall is at a temperature of at least about 25° C. to about 200° C., and preferably at least about 50° C. to about 150° C. above that of the band that is in contact with the exterior surface of the outer wall. In this way the band in contact with the exterior wall absorbs heat that is applied by the other band maintaining the exterior surface of the outer wall at a temperature below that at which the heat can cause surface imperfections. After the seal is made, the seal is cooled by a flow of air or by contact with a cooled band.

DETAILED DESCRIPTION OF THE INVENTION

The invention is directed to producing strong seals at commercially feasible rates with no imperfections in the exterior surface of the plastic of the outer wall. This is accomplished through the use of a band sealer.

Figure 1:
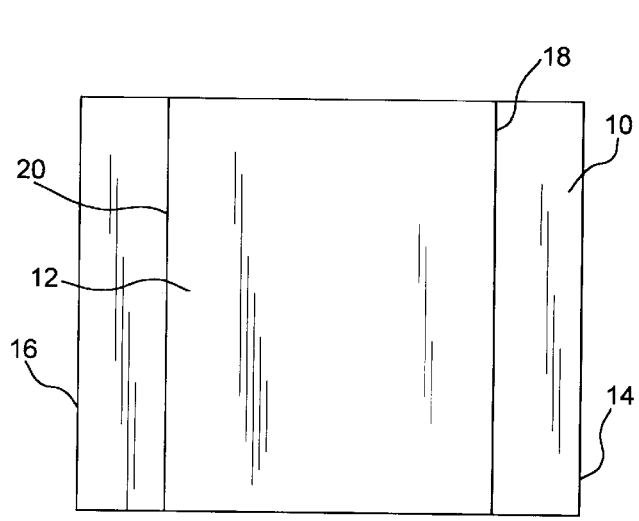
FIG. 1 shows an interior divider wall overlaying the outer wall prior to bonding.
Figure 2:
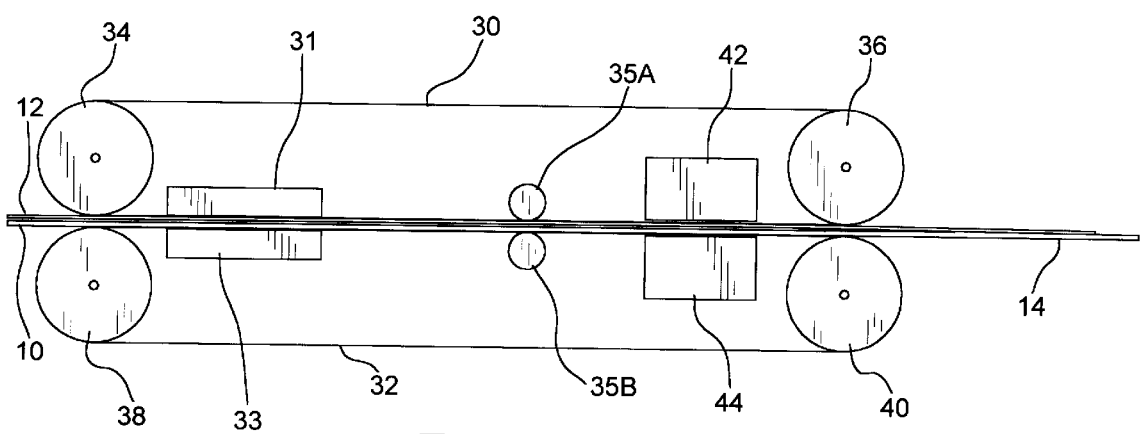
FIG. 2 schematically shows a band sealer.

In FIG. 1 there is shown an interior divider wall 12 overlaying an outer wall 10. The longitudinal edges 18 and 20 of the interior divider wall are to be sealed to the outer wall along the longitudinal edges. This is accomplished by the use of band seal device of FIG. 2. The band sealer consists of bands 30 and 32. Band 30 is carried by pulley wheels 34 and 36 and band 32 is carried by pulley wheels 38 and 40. Heater block 31 heats band 30 and heater block 33 heats band 32. These heaters are independently adjustable, each heating a particular band. Each heater block is in contact with its respective band with the contact pressure being adjustable. Pinch wheels 35(a) and 35(b) apply a pressure to the film between band 30 and band 32. These pinch wheels are adjustable whereby the applied pressure can be adjusted.

Cooling blocks 42 and 44 cool the bands 30 and 32 and the seal areas as the laminate seal passes through this part of the band sealer. Each cooling block is in contact with its respective band with the contact pressure being adjustable. All of these bands contact the seal area and not the full layers 10 and 12. The layers to be sealed at the point of making the seal are passed through the band sealer. The heaters are adjusted to provide a strong seal but no imperfections in the exterior surface of the outer layer. As shown, outer layer 10 is the lower layer and interior divider layer 12 rests on this layer 10. Heater 31 is adjusted to a higher temperature than heater 33. The pressure forming the seal is adjusted by the force of pressure wheels 35(a) and 35(b) against each other and the heater blocks against their respective bands. Heater 31 will be at a temperature to maintain band 30 at least about 25° C. to about 200° C. above that of band 32 which is heated by heater 33, and preferably about 50° C. to about 150° C. In one preferred mode the heater 33 is at ambient temperature, that is, heater 33 is in an off status with the sealing heat provided solely by heater 31. Heater 31 applies heat to the interior divider wall by means of heater band 30. In this way heat is not applied directly to the exterior surface of outer wall 10. However, band 33 will become heated through contact with the outer layer 10 which is the exterior surface of the tubular container wall.

Pressure wheels 35(a) and 35(b) are set to a pressure of about 0.1 kg/cm$^2$ to about 7 kg/cm$^2$, and preferably about 0.25 kg/cm$^2$ to about 4 kg/cm$^2$. Likewise, the heater blocks 31 and 33 and the cooling blocks 42 and 44 bear against their respective bands at about the same pressures as the pressure wheels. The pressure of the heater blocks, pressure wheels and the cooling blocks can be the same or different. These pressures force the softened plastic layers together to produce a stronger seal bond. In the final band sealing step, the sealed layers pass through the cooling blocks.

The interior divider layer and outer layer of plastic to be bonded can be any thermoplastic material. These include the polyolefins such as polyethylene, polypropylenes and polybutadienes; ethylene copolymers with vinyl compounds such as vinyl alcohol and vinyl acetate; acrylonetule-butatadiene-styrenes; and polyesters such as polyethylene terephthalate. The thickness of the outer wall can range from about 0.2 mm to 0.5 mm. The interior divider layer generally will have a thickness less than the outer layer. The inner divider wall will have a thickness of about 0.015 mm to about 0.2 mm.

Figure 3:
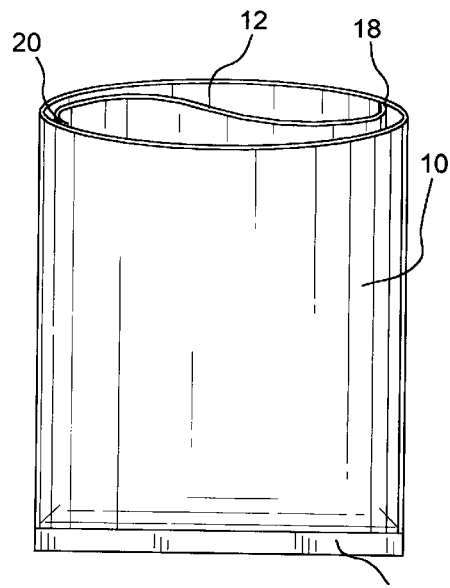
FIG. 3 shows a tubular container in section with the inner divider wall.

FIG. 3 is a view partially in section of a tubular container having an outer wall 10 and an interior wall 12. This interior wall is attached to the outer wall 10 at edge 18 and edge 20. The seal is about 1 mm to about 5 mm or more in width. The seal is continuous, has a high strength and the exterior surfaces of the outer wall 10 are smooth with no imperfections. The lower crimp seal 22 seals the bottom of the tube. The upper part has a nozzle attached.

The foregoing sets out the preferred embodiments of the processes for sealing an inner divider wall to an outer wall. Any modifications which incorporate the techniques disclosed herein are considered to be within the present invention.

I claim:

1. A method for making multichamber tubular containers comprising overlaying at least a second film onto a first film and sealing the longitudinal edges of said second film to said first film, contacting the longitudinal edges of said first film and sealing said longitudinal edges of said first film together to form a tubular body with said first film disposed across said tubular body to form at least two separate chambers, and attaching an exit nozzle to one end of said tubular body, the improvement comprising sealing the longitudinal edges of said second film onto said first film by means of band sealing, a band in contact with said first film being at a lower temperature than a band in contact with said second film.

2. A method as in claim 1 wherein the band in contact with said first film is at a temperature of about 25° C. to about 200° C. less than the band in contact with said second film.

3. A method as in claim 2 wherein the band in contact with said first film is at a temperature of about 50° C. to about 150° C. less than the band in contact with said second film.

4. A method as in claim 1 wherein said first film and said second film are comprised of at least one layer of a polyolefin.

5. A method as in claim 1 wherein said polyolefin is selected from the group consisting of polyethylene, polypropylenes, polybutadienes, ethylene vinyl alcohol copolymers, ethylene vinyl acetate copolymers, acrylonitrile-butatadiene-styrenes, and polyesters and mixtures thereof.

6. A method as in claim 1 wherein said first film has a thickness of about 0.2 mm to about 0.5 mm and said second film has a thickness of about 0.015 mm to about 0.2 mm.

7. A method as in claim 1 wherein during at least part of the time of the sealing of the longitudinal edges of said second film onto said first film a pressure is applied to said first film and to said second film to place said first film and said second film in a more intimate contact.

8. A method as in claim 7 wherein said pressure is about 0.1 kg/cm$^2$ to about 7 kg/cm$^2$.

9. A method as in claim 1 wherein a second end of said tubular body is crimp sealed to close said second end of said tubular body.

10. A method for making multichamber tubular containers comprising overlaying at least a second film onto a first film and sealing the longitudinal edges of said second film to said first film, contacting the longitudinal edges of said first film and sealing said longitudinal edges of said first film together to form a tubular body, and attaching an exit nozzle to one end of said tubular body with said first film disposed across said tubular body to form at least two separate chambers, the improvement component comprising sealing the longitudinal edges of said second film onto said first film by means of band sealing, a band in contact with said first film being at a temperature of about 25° C. to about 200° C. lower than a band in contact with said second film.

11. A method as in claim 10 wherein the band in contact with said first film is at a temperature of about 50° C. to about 150° C. less than the band in contact with said first film.

12. A method as in claim 10 said first film and said second film are comprised of at least one layer of a polyolefin.

13. A method as in claim 10 wherein said polyolefin is selected from the group consisting of polyethylene, polypropylenes and polybutadienes, ethylene vinyl alcohol copolymers, ethylene vinyl acetate copolymers acrylonitrile-butatadiene-styrenes, polyesters and mixtures thereof.

14. A method as in claim 10 wherein said first film has a thickness of about 0.2 mm to about 0.5 mm and said second film has a thickness of about 0.015 mm to about 0.2 mm.

15. A method as in claim 10 wherein during at least part of the time of the sealing of the longitudinal edges of said second film onto said first film a pressure is applied to said first film and to said second film to place said first film and said second film in a more intimate contact.

16. A method as in claim 15 wherein said pressure is about 0.1 kg/cm$^2$ to about 7 kg/cm$^2$.

17. A method as in claim 10 wherein a second end of said tubular body is crimp sealed to close said second end of said tubular body.

\* \* \* \* \*